United States Patent
Osborn et al.

(10) Patent No.: US 8,353,143 B2
(45) Date of Patent: Jan. 15, 2013

(54) LATERAL SEISMIC BRACE

(75) Inventors: Eric C. Osborn, Medina, OH (US); Nicholas J. Ambrogio, Highland Heights, OH (US); Eric J. Wilson, Solon, OH (US); Paul Hart, Warren, OH (US)

(73) Assignee: ERICO International Corporation, Solon, OH (US)

( * ) Notice: Subject to any disclaimer, the term of this patent is extended or adjusted under 35 U.S.C. 154(b) by 491 days.

(21) Appl. No.: 12/356,622

(22) Filed: Jan. 21, 2009

(65) Prior Publication Data
US 2009/0183463 A1 Jul. 23, 2009

Related U.S. Application Data (60) Provisional application No. 61/022,406, filed on Jan. 21, 2008.

(51) Int. Cl.
*E04B 1/00* (2006.01)
*F16L 3/08* (2006.01)
*A47B 3/00* (2006.01)
*A47K 1/08* (2006.01)

(52) U.S. Cl. ........... 52/745.21; 248/70; 248/72; 248/73; 248/74.4; 248/228.1; 248/313; 52/127.2; 52/703

(58) Field of Classification Search .................. 248/70, 248/72, 49, 65, 67.7, 73, 74.4, 231.41, 228.1–228.3, 248/228.6, 313; 52/126.2, 126.7, 127.2, 52/127.5, 299, 489, 702, 703, 167.3, 745.21
See application file for complete search history.

(56) References Cited

U.S. PATENT DOCUMENTS

| 98,656 | A | 1/1870 | Adt |
| 714,461 | A | 11/1902 | Dieter |
| 714,761 | A | 12/1902 | Tilley |
| 1,264,446 | A | 4/1918 | Sears |
| 1,282,489 | A | 10/1918 | Strodel |
| 1,559,084 | A | 10/1925 | Gaillard |
| 2,045,307 | A | 6/1936 | O'Connell |
| 2,375,513 | A | 5/1945 | Bach |

(Continued)

FOREIGN PATENT DOCUMENTS

CA 2279777 A1 10/2000

(Continued)

OTHER PUBLICATIONS

International Search Report and Written Opinion from corresponding International Application No. PCT/US09/31380.

(Continued)

*Primary Examiner* — William Gilbert
(74) *Attorney, Agent, or Firm* — Renner, Otto, Boisselle & Sklar, LLP (57) ABSTRACT

A sway brace fitting clamp is used for lateral bracing of sprinkler or other types of pipe (designated the service pipe) to a structure, to prevent movement of the service pipe perpendicular to the axis of the pipe relative to the structure to which it is attached. The sway brace fitting clamp includes a U-bolt which fits around the service pipe, and a pair of hooks that are coupled to straight ends of the U-bolt, for hooking the sway brace pipe. A pair of nuts engages threaded portions of the U-bolt ends. The nuts may be tightened to pull the sway brace pipe into contact with the service pipe, firmly clamping the sway brace pipe and the service pipe together.

25 Claims, 4 Drawing Sheets

U.S. PATENT DOCUMENTS

| | | | |
|---|---|---|---|
| 2,659,561 A * | 11/1953 | Kindorf | 248/228.6 |
| 2,665,951 A | 1/1954 | Bobst | |
| 2,699,190 A | 1/1955 | Packer | |
| 2,715,013 A | 8/1955 | Slick | |
| 2,720,016 A | 10/1955 | Johannsen | |
| 2,722,858 A | 11/1955 | Oyen | |
| 2,733,034 A * | 1/1956 | Tormo | 248/72 |
| 2,940,495 A * | 6/1960 | Wing | 411/305 |
| 2,951,672 A | 9/1960 | Bott | |
| 3,100,048 A | 8/1963 | Halverson | |
| 3,120,046 A | 2/1964 | Olsen | |
| 3,258,821 A | 7/1966 | Curran | |
| 3,269,766 A | 8/1966 | Gardner | |
| 3,342,909 A | 9/1967 | Fenton | |
| 3,572,623 A | 3/1971 | Lapp | |
| 3,575,405 A | 4/1971 | Harding | |
| D226,856 S | 5/1973 | Leto et al. | |
| 3,874,035 A * | 4/1975 | Schuplin | 248/72 |
| 3,937,121 A | 2/1976 | Schubert | |
| 3,947,011 A | 3/1976 | Tsuyama | |
| 3,955,250 A * | 5/1976 | Heckethorn | 24/277 |
| 3,997,152 A | 12/1976 | Sass et al. | |
| 4,065,218 A | 12/1977 | Biggane | |
| 4,183,571 A | 1/1980 | Renfroe | |
| 4,228,983 A | 10/1980 | Bowman, Jr. | |
| D259,464 S | 6/1981 | Paley | |
| D262,237 S | 12/1981 | Stauber | |
| 4,342,477 A | 8/1982 | McClure | |
| 4,429,440 A | 2/1984 | Laughlin et al. | |
| 4,491,358 A | 1/1985 | Choung | |
| 4,524,942 A | 6/1985 | Kueny | |
| 4,570,885 A | 2/1986 | Heath | |
| 4,763,871 A | 8/1988 | Probst | |
| 4,844,397 A | 7/1989 | Skakoon et al. | |
| 4,850,630 A | 7/1989 | Davies | |
| 4,998,691 A | 3/1991 | Brown | |
| 5,005,890 A | 4/1991 | Schwenger | |
| 5,326,059 A | 7/1994 | Pryor et al. | |
| 5,349,979 A | 9/1994 | Zeien et al. | |
| 5,687,938 A | 11/1997 | Bailey | |
| 5,931,259 A | 8/1999 | Hoey | |
| 6,012,691 A | 1/2000 | van Leeuwen et al. | |
| 6,098,942 A | 8/2000 | Heath | |
| 6,119,992 A | 9/2000 | Stuart | |
| 6,227,757 B1 | 5/2001 | Delouvee et al. | |
| 6,273,372 B1 | 8/2001 | Heath | |
| 6,334,285 B1 | 1/2002 | Kirschner | |
| 6,517,030 B2 | 2/2003 | Heath | |
| 6,581,884 B1 | 6/2003 | Gretz | |
| 6,629,678 B1 | 10/2003 | Kirschner | |
| 6,702,132 B1 | 3/2004 | Moore et al. | |
| 6,708,930 B2 | 3/2004 | Heath | |
| 6,789,649 B2 | 9/2004 | Herrmann | |
| 6,953,174 B2 * | 10/2005 | Heath | 248/62 |
| 7,097,141 B2 | 8/2006 | Heath | |
| 7,191,987 B2 | 3/2007 | Heath | |
| 7,431,252 B2 | 10/2008 | Birli et al. | |
| 2005/0230582 A1 | 10/2005 | Birli et al. | |
| 2006/0024127 A1 | 2/2006 | Heath | |
| 2006/0228187 A1 * | 10/2006 | Sussenbach | 411/29 |
| 2007/0170317 A1 | 7/2007 | Heath | |
| 2008/0277535 A1 | 11/2008 | Kirschner | |
| 2009/0183443 A1 | 7/2009 | Osborn et al. | |
| 2009/0183462 A1 | 7/2009 | Osborn et al. | |
| 2009/0184222 A1 | 7/2009 | Osborn et al. | |

FOREIGN PATENT DOCUMENTS

| | | | |
|---|---|---|---|
| JP | 57131907 U | | 8/1982 |
| JP | 57176504 U | | 11/1982 |
| JP | 02012509 U | | 1/1990 |
| JP | 7-38863 | * | 7/1995 |
| JP | 738863 U | | 7/1995 |
| JP | 8128196 A | | 5/1996 |
| JP | 08144508 A | | 6/1996 |
| JP | 9210021 A | | 8/1997 |
| JP | 11035128 A | | 2/1999 |
| JP | 11256813 A | | 9/1999 |
| KR | 2019980059451 | | 10/1998 |
| KR | 200396479 | | 9/2005 |
| WO | 2009094302 A2 | | 7/2009 |
| WO | 2009094303 A2 | | 7/2009 |
| WO | 2009094313 A2 | | 7/2009 |
| WO | 2009094320 A2 | | 7/2009 |

OTHER PUBLICATIONS

Supplementary Search Report from related European Application No. 09704041.4.

* cited by examiner

FIG. 12

LATERAL SEISMIC BRACE

This application claims priority under 35 USC 119 from U.S. Provisional Application No. 61/022,406, filed Jan. 21, 2008, which is incorporated herein by reference in its entirety.

BACKGROUND OF THE INVENTION

1. Field of the Invention

The invention is in the field of seismic bracing and sway braces.

2. Description of the Related Art

Seismic sway bracing is often required for plumbing systems, fire sprinklers, electrical systems, heating conduits, ventilation conduits, air conditioning conduits, and other structural and non-structural components of a building as well as some equipment installed in buildings. One way of sway bracing is to couple a system to be braced to a pipe or other rigid structural member that is in turn coupled to building structure, such as a wall, ceiling, or a building structural member.

SUMMARY OF THE INVENTION

An aspect of the invention involves a lateral sway brace fitting in which the sway brace pipe is tangential to the outside diameter (OD) of the service pipe, and perpendicular to the longitudinal axis of the service pipe. It is made up of three different components: a wireform body, two stamped attachment hooks, and two swivel nuts.

The main body of the sway brace fitting is a U-bolt that wraps around a service pipe. The "U" shape allows the sway brace fitting to be placed on the service pipe through the open end of the "U". It is a wireform that is of sufficient diameter to remain stiff when subject to test loads. For a sample embodiment, the wireform may be wire diameter used to upset a ⅝"-11 thread. The inside diameter of the wire is sized to fit snugly to the service pipe. Standard sizing for schedule 40 and schedule 80 steel pipe was referenced for the configuration, but it will be appreciated that other pipe sizes may be used. Normal clearance was applied to the standard diameter to determine the inside diameter (ID). A novel feature of one embodiment of the U-bolt is the shortened legs of the U. A typical U-bolt has extra length on the legs to aid with assembly. However for one embodiment the intended use of the tips of the legs is to engage the sway brace pipe. The length of the legs is determined by the plane defined by the tangency of the service pipe and the sway brace pipe. At the tips of the U-bolt legs are conical protrusions used to engage the sway brace pipe. This engagement is caused by the components described further below. The conical tips are generated prior to forming of the wire into a U-shape. These tips can be cold-worked or thermally treated to gain additional hardness to improve the ability of the conical shape to penetrate into the sway brace pipe.

According to another specific embodiment, the ID of the U-bolt is designed to fit, with minimal clearance, on the sprinkler system pipe. Standard sizing for ASTM A53 and ASTM A795 steel pipe was referenced for the configuration, although it will be appreciated that other pipe sizes could be used. Another feature of the U-bolt is a pair of offsets, applied to widen the legs of the "U". This geometry prevents interference between the u-hooks and the sprinkler system pipe during the process of installation.

According to one embodiment, at each end of the U-bolt is a formed hook component. It provides a frame with which to capture the sway brace pipe and to support the loads of embedding the tips of the U-bolt in the sway brace pipe. The "U" shape provides symmetric loading between one tip of the U-bolt and the portion of the sway brace pipe which it engages. The general shape of the hook component is a "U" with squared corners and a flat bottom. In the sides of the "U" are open cutouts into which the sway brace pipe can be inserted and in which the sway brace pipe is clamped. The open side allows for the pipe to be inserted perpendicular to the axis of the pipe at any longitudinal position, without the necessity of feeding the pipe though the clamp longitudinally. The open slot has a "V" shaped root sufficiently opposite the closed end of the "U". The "V" shape root is sized so that several sizes of sway brace pipes can be clamped into it. In particular, it may be sized for 1" and 1.25" (25.4 mm and 38.1 mm) steel pipe. The closed end of the "U", as previously mentioned, is flat. This is to accommodate a swivel nut. The swivel nut engages the threaded portion of the main U-bolt of the sway brace fitting and bears against the flattened portion of the "U" shaped hook component. This interaction allows the tip of the U-bolt to be driven into the sway brace pipe, and is resisted by the V-shaped root in the open slot of the hook component.

One method of creating the "U" shaped component with a flat bottom is stamping. However, other possible manufacturing processes are casting, forging, or machining. A typical thickness is 0.25" (6.4 mm). Typically, the width would be sufficiently larger than the sway brace pipe in order to capture the sway brace pipe and carry the required load around it. This may be approximately 3" (76 mm).

The final component is a swivel nut. Two possibilities for the swivel nut for use with this embodiment are described herein. The first is the swivel-hex-shear-rivet-nut. Simply, it is a hollow rivet with a central flange and internal thread. One end of the rivet has a hex shaped outside. The opposite end is thin and tubular. During installation, the thin tube is swaged to loosely capture the stamped "U" component. The hex allows the rivet-nut to be rotated by a wrench.

The second is threaded internally, has a flange at one end, a cylindrical shaft portion, and a hex at the end opposite the flange. The nut is inserted into the "U" shaped stamped component. The flange bears against the inside of the closed end of the "U". The cylindrical shaft portion locates and guides the nut within a hole in the "U" shaped stamped component. The hex provides a means for a wrench to engage the nut.

The stamped hook ends are stored loose on the U-bolt and rotated to be flat with the plane of the U-bolt for ease of shipping. During installation, they are rotated perpendicular to the plane of the U-bolt and slid into position on the swivel nut. The open sides of the two hooks can be oriented in the same direction, or in opposite directions.

Within the assembly, a square plastic washer can be used as a detent to prevent rotation of the stamped hook end to further aide installation. Alternatively, the detent mechanism can be made of another material such as spring steel.

According to another embodiment, at each end of the U-bolt is a formed hook component to provide a frame that captures the sway brace pipe and transmits the clamping forces from the U-bolt to the sway brace pipe. The general shape of the hook component is a "U" that wraps approximately 180° of the U-bolt thread, and projects tangentially.

The sides of the "U" are open cutouts with a skewed "V" profile. The "V" profile is generally perpendicular to the "U" shape of the formed component, and open in the direction of the closed end of the U-bolt. The "V" shape profile is sized so that several sizes of sway brace pipes can be clamped into it. In particular, it is sized for 1 inch (25.4 mm) and 1.25 inch (31.8 mm) diameter steel pipe. The angle of the "V" may be approximately 60° from parallel to the U-bolt. This angle serves to pull the sway brace pipe to a position of close proximity to the U-bolt. The "V" profile has tooth-like protrusions that point generally inward to the sway brace pipe. Under clamping forces, the teeth improve the load transfer capability from the sway bray pipe to the sway brace fitting.

The clamping force generated by a torque-limiting nut on the U-bolt is applied to the hooked end along the axis of the portion of the hooked end that wraps the threaded portion of the U-bolt. The clamping force applied to the hooked end by the nut is resisted by the brace pipe at the open "V" profile. These two, non-collinear, forces on the hooked end impart a moment. The moment is resisted by the side of the hooked end opposite the position of the nut by contact with the threaded portion of the U-bolt. To complete the resisting moment, another contact point was added in the form of a rivet. The rivet spans the "U" shaped form of the hooked end, and is positioned tangential to the threaded portion of the U-bolt and is located in close proximity to the nut.

Clamping pressure is accomplished through the use of two nuts. One nut is threaded onto each end of the U-bolt. The nuts used may be torque limiting. The torque-limiting mechanism of the nut is a reduced cross-section between a threaded portion of the nut and a driving portion. Upon application of a predetermined level of torque, the reduced cross-section will fracture, preventing the application of more torque to the nut.

According to an aspect of the invention, a sway brace fitting clamp includes a single U-bolt that surrounds a pipe and that has sharpened ends or tips that engage a bracing pipe clamped to the surrounded pipe.

According to another aspect of the invention, a sway brace fitting clamp includes a hooked connection between a U-bolt and a brace pipe that allows for the brace pipe to be drawn onto the sharpened ends or tips of the U-bolt.

According to yet another aspect of the invention, a sway brace fitting clamp includes a hooked end that is notched such that it can accommodate multiple sizes of brace pipes, such as both 1 inch (25.4 mm) and 1.25 inch (31.8 mm) diameter pipes. This is accomplished with a notch with a V-shaped root. The hook is open, allowing for quick attachment to the brace pipe, by sliding onto the brace pipe in a direction perpendicular to the brace pipe at any longitudinal position of the brace pipe, without the installer being required to feed the pipe through the clamp.

According to still another aspect of the invention, a sway brace fitting clamp includes a swiveling-hex-shear-rivet-nut that provides the connection between the hooked ends that engage a brace pipe, and a U-bolt that captures a service pipe (or other object). The swivel allows for relative motion, and therefore adjustment of the threaded connection. The shear features allows for a maximum torque limit on the fastener. The rivet feature allows for a quick means to secure the component to the hooked end.

According to a further aspect of the invention, a sway brace fitting clamp includes a single U-bolt that surrounds, and provides means for engaging, a sprinkler system pipe or other round object.

According to a still further aspect of the invention, a sway brace fitting clamp includes a hooked connection between a U-bolt and a sway brace pipe that provides a means for the brace pipe to be drawn onto a sprinkler system pipe (or other object to be braced).

According to another aspect of the invention, A hooked end that is notched such that it can accommodate both 1 inch (25.4 mm) and 1.25 inch (31.8 mm) brace pipes. This is accomplished by the notch having a generally v-shaped root. The hook is open, allowing for quick attachment to the brace pipe, by sliding the brace fitting onto brace pipe in a direction perpendicular to the axis of the brace pipe. This action can be performed at any longitudinal position of the brace pipe, without the installer being required to feed the pipe through the clamp.

According to still another aspect of the invention, The v-shaped notch of said hooked ends contains sharp protrusions, directed generally inward to the "V". These protrusions or "teeth" increase the strength of the connection between the hook of the clamp and the brace pipe.

According to a further aspect of the invention, a clamp includes offsets, integral to a U-bolt, which produce clearance between the hooked end and sprinkler system pipe for unobstructed installation.

According to a still further aspect of the invention, a clamp includes torque limiting nuts that, in combination with a U-bolt, produce the closure force on the hooked ends, and clamping between all components.

According to another aspect of the invention, a clamping device is a lateral sway brace fitting in which the sway brace pipe is tangential to the OD of the sprinkler system pipe and perpendicular to the longitudinal axis of the service pipe. It is made up of three different components; a wireform body, two attachment hooks, and two torque-limiting nuts.

According to yet another aspect of the invention, a sway brace fitting clamp for coupling a sway brace pipe to an object includes: a U-shape bolt having a central curved body and a pair of threaded ends emanating from the central body; a pair of hooks coupled to respective of the ends; and nuts threaded onto the threaded ends, wherein the nuts can be rotated to bear against the hooks to move the hooks toward the curved body.

According to still another aspect of the invention, a method of seismic bracing includes: placing a sway brace pipe substantially perpendicular to a service pipe; after the placing, engaging the sway brace pipe and the service pipe with a sway brace fitting clamp, wherein the engaging does not require movement of either of the pipes; and tightening the sway brace fitting clamp to couple together the sway brace pipe and the service pipe.

Unless it is indicated otherwise, it is to be understood that the above aspects of the invention and the features of the embodiment(s) of the invention described below, may be combinable in a single device, in various combinations.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Annexed are drawings depicting one or more embodiments of the invention. The drawings are not necessarily to scale.

DETAILED DESCRIPTION

A sway brace fitting clamp is used for lateral bracing of sprinkler or other types of pipe (designated the service pipe) to a structure, to prevent movement of the service pipe perpendicular to the axis of the pipe relative to the structure to which it is attached. The sway brace fitting clamp includes a U-bolt which fits around the service pipe, and a pair of hooks that are coupled to straight ends of the U-bolt, for hooking the sway brace pipe. A pair of nuts engages threaded portions of the U-bolt ends. The nuts may be tightened to pull the sway brace pipe into contact with the service pipe, firmly clamping the sway brace pipe and the service pipe together.

Following are relevant definitions:

1) STRUCTURE ATTACHMENT FITTING—A device used to attach a sway brace directly to the building structure;

2) SWAY BRACE—A rigid structural member, typically a piece of steel pipe, strut or angle, intended to attach the sprinkler system pipe (or other object to be braced) to a building structure using a sway brace fitting attached to the sway brace and sprinkler system pipe (or other object to be braced); and a structure attachment fitting attached to the sway brace and building structure;

3) SWAY BRACE ASSEMBLY—A structural system consisting of a sway brace connected to a sway brace fitting attached to the sprinkler system pipe (or other object to be braced) on one end and connected to a structure attachment fitting attached to the building on the other. These assemblies are intended to connect sprinkler system piping or other piping systems (or other object to be braced) to a building structure to provide resistance to relative horizontal movement between the building and the sprinkler system piping or other piping systems (or other object to be braced) during an earthquake or other shock waves impacting a building; and 4) SWAY BRACE FITTING—A device used to attach a sway brace to the sprinkler system piping (or other object to be braced).

Referring initially to FIGS. 1-4, a clamp or brace fitting 10 is shown for coupling a sway brace pipe 12 to a service pipe or other object to be braced 14. The clamp 10 includes a U-shape wire form, a U-shape bolt 18 that wraps around the service pipe 14 (or other pipe or circular object). The U-shape bolt 18 has a curved central portion 20, and a pair of legs 22 and 24 extending from opposite sides of the central portion 20. The central portion 20 receives the pipe 14, and is against the pipe 14 when the clamp 10 is installed, with the legs 22 and 24 extending along opposite diametrically-opposed sides of the pipe 14. The legs 22 and 24 may be straight extensions from the central bolt portion 20. Alternatively, the legs may have one or more bends that change the offset between different parts of the legs 22 and 24. The legs 22 and 24 have threaded portions 26 and 28. The threaded portions 26 and 28 may terminate at a plane of tangency 30 between the service pipe 14 and the sway brace pipe 12, when the clamp 10 is installed. The threaded portions 26 and 28 may have a left-handed thread for more intuitive assembly. The legs 22 and 24 may have tips, such as the tip 32 (FIGS. 3 and 4), that are sharpened into conical points to engage the sway brace pipe 12. The conical tips 32 are generated prior to forming of the wire into a U-shape. These tips 32 can be cold-worked or thermally treated to gain additional hardness to improve the ability of the conical shape to penetrate into the sway brace pipe.

Figure 1:
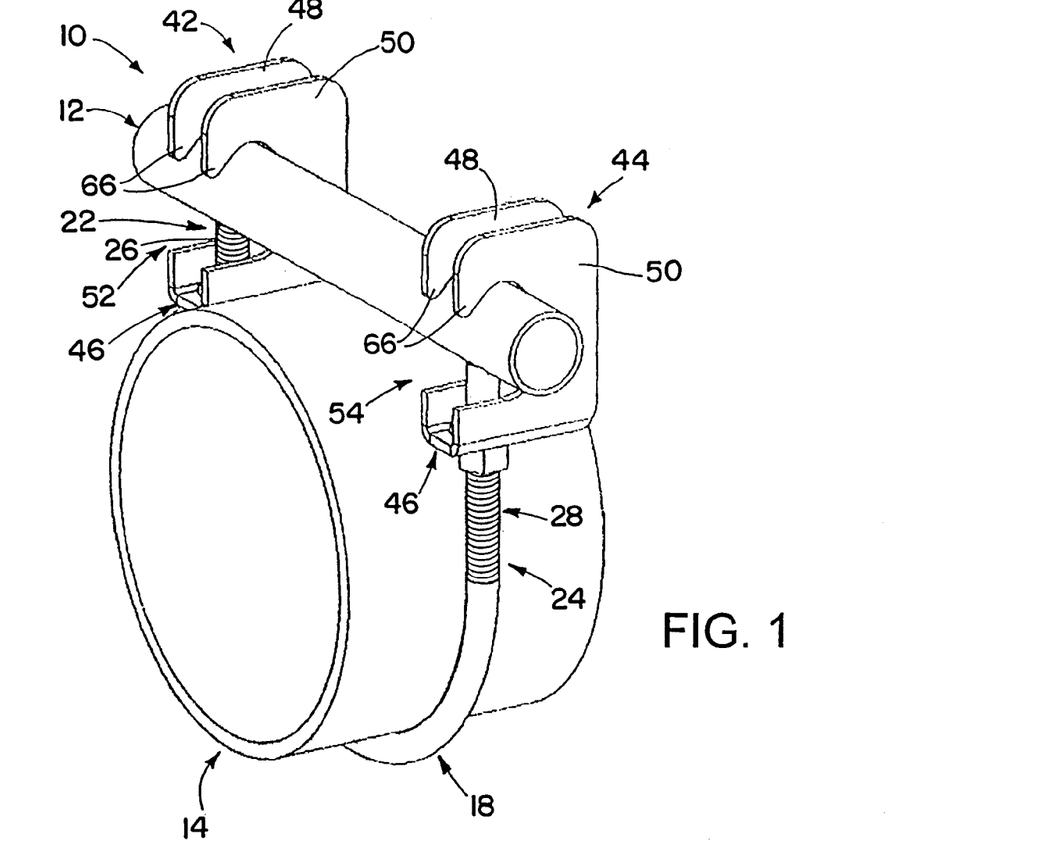
FIG. 1 is an oblique view of a sway brace fitting clamp joining together a sway brace pipe and a service pipe, in accordance with an embodiment of the present invention.
Figure 2:
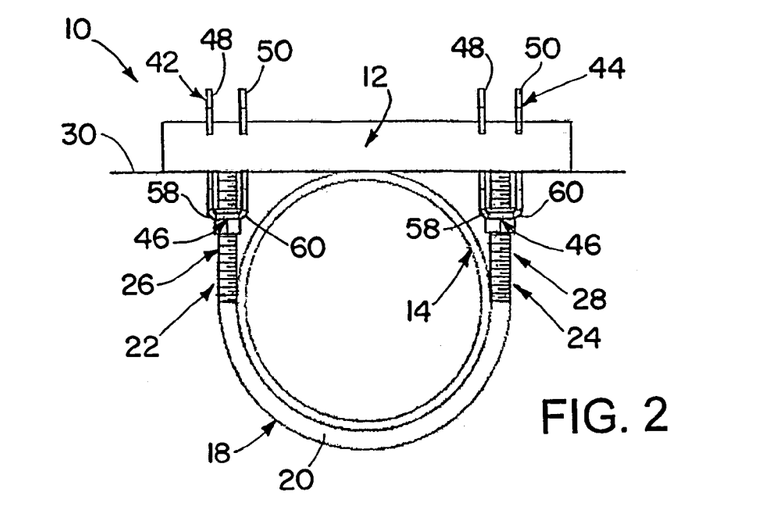
FIG. 2 is a side view of the sway brace fitting clamp of FIG. 1.

A pair of hooks 42 and 44 are coupled to the legs 22 and 24 to engage the sway brace pipe 12. The hooks 42 and 44 may be stamped components with a U-shaped profile, each having a flattened central closed end or body 46, and a pair C-shape hooked sides 48 and 50 extending from the central body 46. The sides 48 and 50 define respective openings or slots 52 and 54 for receiving the sway brace pipe 12. The sides 48 and 50 are coupled to the central body 46 at bottom edges 58 and 60 of the sides 48 and 50. Otherwise the sides 48 and 50 may be freestanding, not coupled to any other part of the clamp 10.

The U-shape for the hooks 42 and 44 provides a symmetrical loading condition from the U-bolt 18 to the sway brace pipe 12. Each leg or hooked side 48 and 50 of each of the U-shaped stamped hooks 42 and 44 has a V-shaped root 64 at one end of the each of the openings or slots 52 and 54. The V-shaped root 64 is configured to accommodate several sizes of the sway brace pipe 12, such as 1 inch (25.4 mm) diameter pipe 12' and a 1.25 inch (31.8 mm) diameter pipe 12". The root 64 has a curved portion at the base of its "V" shape. Hook tips 66 along the tops of the openings 52 and 54 may be used to help retain the sway brace pipe 12 in the openings 52 and 54. The open ends of the U-shaped stamping are left open, but it should be recognized that optionally they can be connect by the use of studs or rivets through pierced holes 68 (FIG. 4).

Figures 3, 5:
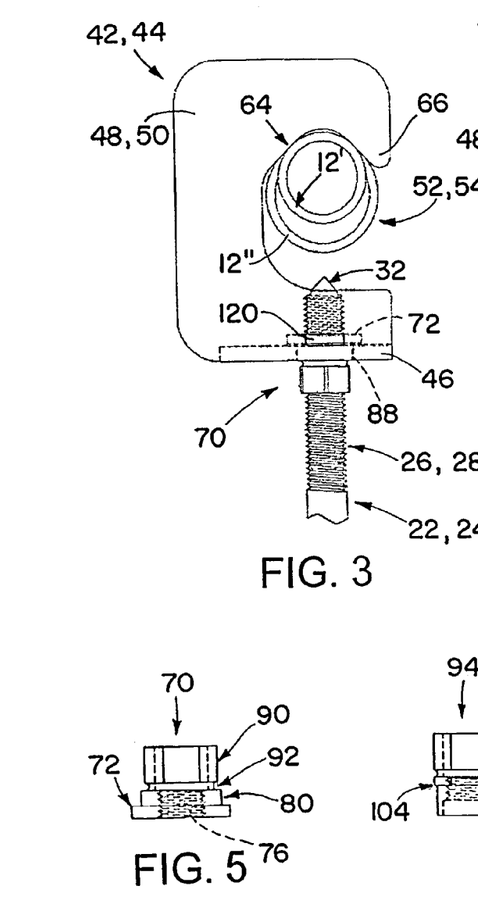
FIG. 3 is an end view of one of the hooks of the sway brace fitting clamp of FIG. 1, showing one possible configuration.
FIG. 5 is a side view of a shear nut usable as part of the sway brace fitting clamp of FIG. 1.

Swivel nuts are used to link the U-bolt 18 and the hooks 42 and 44 together. The swivel allows for relative motion, and therefore adjustment of the threaded connection. FIGS. 3 and 5 show one type of swivel nut, a swivel nut 70 that has a flange 72 that bears against the flat, closed-end body 46 of the U-shaped hooks 42 and 44 when the swivel nut 70 is tightened on the threaded potions 26 and 28 of the U-bolt 18. Threads 76 of the swivel nut 70 may be left-handed to match those of the U-bolt 18. A center portion 80 of the length of the swivel nut 70 is cylindrical so as to freely turn within a hole 88 in the closed end 46 of the U-shaped stamped hooks 42 and 44. The cylindrical center portion 80 and the flange 72 contain the internal threads 76. At the end of the nut opposite the flange is a hex head potion 90 with an internal diameter larger than the major diameter of the U-bolt threaded portions 26 and 28. Between the hex portion 90 and the cylindrical portion 80 is a section of reduced diameter, a shear band 92. This reduced diameter shear band 92 will break when a given torque is applied to the hex portion 90 of the nut 70. As alternative, the swivel nuts 70 may be produced without the shear band.

Figure 4:
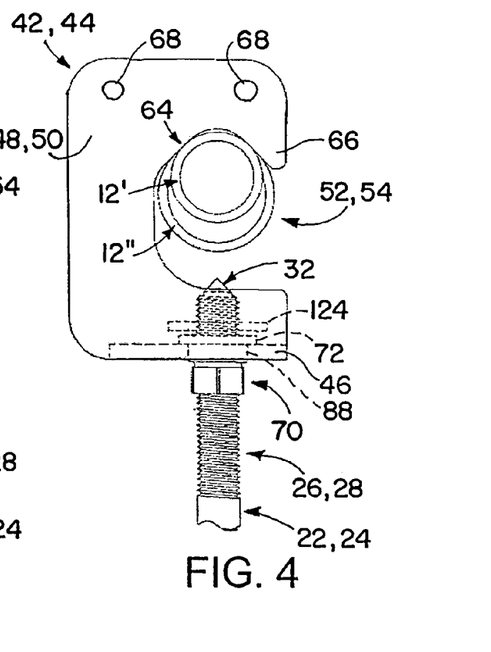
FIG. 4 is an end view of one of the hooks of the sway brace fitting clamp of FIG. 1, showing another possible configuration.
Figures 6A, 7:
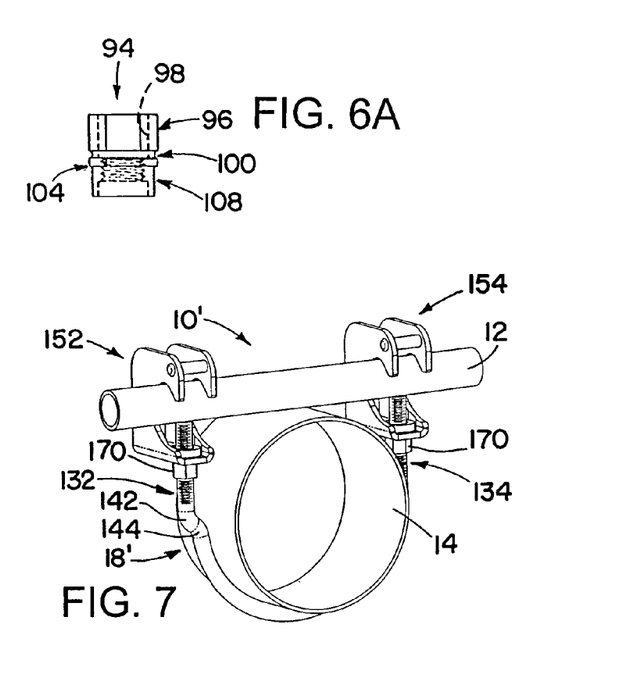
FIG. 6A is a side view of a shear-rivet nut usable as part of the sway brace fitting clamp of FIG. 1.
FIG. 7 is an oblique view of a sway brace fitting clamp joining together a sway brace pipe and a service pipe, in accordance with an alternate embodiment of the present invention.
Figure 6B:
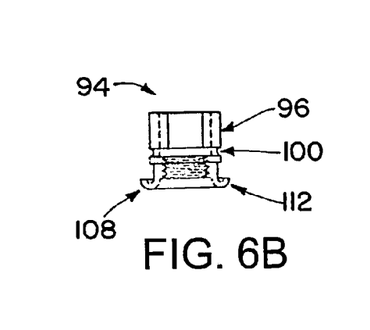
FIG. 6B is a side view of the nut of FIG. 6A, showing the nut in its riveted condition.

FIGS. 4, 6A, and 6B show an alternative type of swivel nut, a swivel rivet-nut 94. The function of the swivel rivet-nut 94 is the same as the swivel nut 70 (FIG. 5), but with the added feature of self-retention in the assembly. The swivel rivet nut 94 also contains a hex portion 96 with oversized internal diameter 98 and a shear band 100. Alternatively, the shear band 100 may be excluded. The swivel rivet-nut 94 also has a flange 104 similar to the swivel nut 70; however it is installed on the outside of the U-shaped hooks 42 and 44. Extending from the flange 104 is a thin-wall tube rivet portion 108 of the component. The rivet portion 108 is a thin-wall tube that protrudes into the closed end 46 of the U-shaped hooks 42 and 44 through the hole 88. During factory assembly, the tube 108 is swaged over, as shown at 112, to retain the swivel rivet-nut 94 into the U-shaped hooks 42 and 44.

When in the installed state, the sway brace pipe 12 is perpendicular and tangent to the service pipe 14, and the two components 12 and 14 are in direct contact. The main body 20 of the U-bolt 18 wraps around the service pipe 14. The action of tightening the swivel nut 70 or swivel rivet-nut 94 creates a snug fit between the U-bolt 18 and the service pipe 14. The action of the tightening the swivel nut 70 or swivel rivet-nut 94 causes the U-bolt tip 32 to protrude into the U-shaped hooks 42 and 44 and bear against the sway brace pipe 12. The tips 32 may displace and/or penetrate material of the sway brace pipe 12. This action is directly opposed by the flange 72 of the swivel nut 70 or the flange 104 of the swivel rivet-nut 94 bearing against the flat, closed end 46 of the U-shaped stamped hooks 42 and 44. This action is also supported by the sway brace pipe 12 bearing against the V-shaped root 64 of the open slots 52 and 54.

As shown in FIG. 3, one method of retention of the U-shaped hooks 42 and 44 within the assembly is to capture the swivel nut 74 within the U-shaped hooks 42 and 44. In this embodiment two rectangular windows 120 are pierced, one each in the legs or sides 48 and 50 of the U-shaped hooks 42 and 44, adjacent to the flat, closed end 46. The flange 72 of the swivel nut 70 protrudes slightly into each of the windows 120, creating a positive connection between the components. Another method, shown in FIG. 4, is to use an additional component 124 to restrain the U-shaped stamping (hooks) 42 and 44 to the U-bolt 18. The additional component 124 may be a washer, such as a suitable plastic washer or spring steel washer, for holding the hooks 42 and 44 in place. The washer acts as a spring clip that engages the threads of the U-bolt 18 and expands against the inner surfaces of the hook ends 42 and 44. This prevents any movement of the hook ends (42 and 44) relative to the threaded portions 26 and 28 of the U-bolt 18, along the axis of the threaded portions 26 and 28.

One method of creating the "U" shaped component with a flat bottom is stamping. However, other possible manufacturing processes are casting, forging, or machining. A typical thickness is 0.25" (6.4 mm). Typically, the width would be sufficiently larger than the sway brace pipe in order to capture the sway brace pipe and carry the required load around it. This may be approximately 3" (76 mm).

The stamped hook ends 42 and 44 may be stored loose on the U-bolt 18 and rotated to be flat with the plane of the U-bolt for ease of shipping. During installation, the hooks 42 and 44 are rotated perpendicular to the plane of the U-bolt 18 and slid into position on the swivel nuts. The open sides of the two hooks 42 and 44 can be oriented in the same direction (as shown), or in opposite directions (not shown).

The sway brace assembly as installed resists any relative motion between the service pipe and structure during a seismic event or other similar building swaying event that might be seen in bomb blasts or other shock waves impacting a building. The loads associated with the restraint of the service pipe to the structure are carried from the service pipe 14 through the sway brace fitting or clamp 10, through the sway brace pipe 12, through the structural attachment, and into the structure itself. The interlocking of the components of the sway brace fitting 10 described above, with the service pipe 14 and the sway brace pipe 12, permits the brace fitting 10 to transmit these seismic loads.

One advantage of the brace fitting 10 is that all pipes, braced and bracing, can be in their final installed location prior to installation of the brace fitting. The brace fitting of clamp 10 will not disturb the position of either of the pipes 12 and 14 during installation, minimizing the number and complexity of steps for installation. Prior systems often require that the brace pipe be fed through the brace fitting to complete the installation.

Another advantage over prior systems is that with all pipes in their final installed location, no disassembly of hardware is needed. Prior systems often required that all parts be disassembled, the wire-form body of the brace fitting be fed over the brace pipe and under/around the service pipe, and all loose hardware be reassembled.

The brace fitting 10 provides positive, interlocking engagement between the wire-form U-bolt 18 and the sway brace pipe 12, in addition to any frictional benefit gained by the clamping hooks. The positive interlocking engagement is derived from the sharpened ends or tips 32 of the U-bolt 18 that penetrate the sway brace pipe 12. Prior systems have often relied solely on friction for coupling.

Also prior sway brace fittings have sometimes been tensioned around service pipes. The tension has been imparted by tightening against the sway brace pipe on either side of the service pipe. This action creates a bending moment in the sway brace pipe, causing it to bend around the service pipe. The larger the service pipe being braced, the greater this bending moment is, to the point that the clamp ceases to function.

The clamp or sway brace fitting 10 restricts any bending moment independently attaching to the sway brace pipe on either side of the service pipe being braced. The U-bolt 18 may be sized such that the assembly secures the service pipe 14 against the sway brace pipe 12 without extreme bending.

The shear nut 70 and the shear rivet-nut 94 provides a means of limiting the torque applied to the thread that imparts penetrating force on the U-bolt end into the sway brace pipe 12. Alternatively, torque may be limited by use of a torque wrench or visual indication to discourage overtightening a non-shear nut.

Some prior configurations allowed the sway brace fitting to quickly slip over a service pipe, but required that the brace pipe be fed through the sway brace fitting during assembly. In addition, some prior systems could only accommodate one size of brace pipe (sway brace) per part number, requiring two models, one each for two sizes of brace pipe for each one size of braced pipe.

The clamp 10 also expedites and simplifies installation, reducing the number of part configurations that need to be stocked for use. All of these are advantages of the clamp 10 (and the other sway brace fitting clamps described herein).

FIG. 7 shows an alternative clamp or sway brace fitting 10' for clamping together a sway brace pipe 12 and a service pipe 14. Many of the features of the clamp 10' are the same as those of the clamp 10 (FIG. 1). One difference is that a U-bolt 18' of the clamp 10' has bends 142 and 144 in each of its legs 132 and 134. The bends 142 and 144 have equal angles that maintain the parallelism of the ends of the threaded legs 132 and 134. The additional offset created by the bends 142 and 144 allows the hooked ends 152 and 154 to pass over the pipe 14 during installation without interference.

The shear nuts 170 of the sway brace fitting 10' are not shear nuts. The nuts 170 are tightened without having their heads shear off. Otherwise the shear nuts 170 may be similar to the shear nut 70 (FIG. 5).

Figures 8, 9:
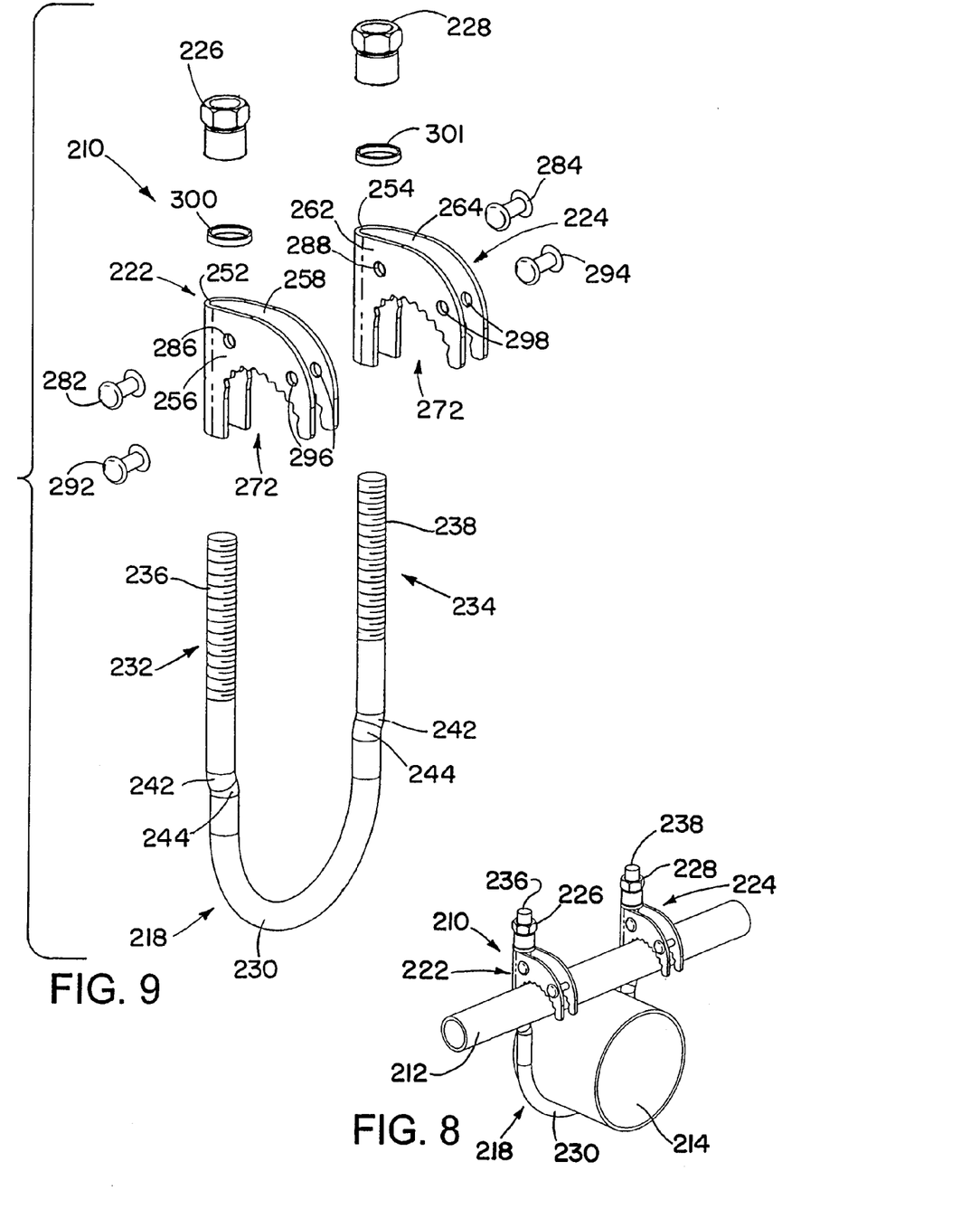
FIG. 8 is an oblique view of a sway brace fitting clamp joining together a sway brace pipe and a service pipe, in accordance with another embodiment of the present invention.
FIG. 9 is an exploded view of the clamp of FIG. 8.

Turning now to FIGS. 8 and 9, a clamp or sway brace fitting 210 is shown. Features of the clamp 210 may be combinable with those of the clamp 10 (FIG. 1) described earlier, where suitable. The sway brace fitting clamp 210 is used to couple together a sway brace pipe 212 and a pipe 214 to be secured, such as service pipe, for instance a sprinkler pipe. The clamp includes a U-bolt 218, to which a pair of hooks or hooked ends 222 and 224 are coupled. Nuts 226 and 228, which may be shear nuts, are used to cinch the hooks 222 and 224 against the sway brace pipe 212.

A main body or curved central portion 230 is a U-shaped wire-form of the U-bolt 218, which wraps around a service pipe 214. Emanating from opposite sides of the central portion 230 are straight threaded legs 232 and 234 of the U-bolt 218. The threaded legs 232 and 234 extend away from the sprinkler pipe 214, beyond the sway brace pipe 212, and through the hook ends 222 and 224, when the clamp 210 is in its installed position. The threaded legs 232 and 234 have threaded portions 236 and 238 that are threadedly engaged by the nuts 226 and 228. The nuts 226 and 228 may be tightened to different locations along the threaded portions 236 and 238 to accommodate different diameters of sway brace pipe.

Each leg 232 and 234 of the U-bolt 218 has two bends 242 and 244 that increase the spacing between ends of the legs 232 and 234. The bends 242 and 244 have equal angles that maintain the parallelism of the ends of the threaded legs 232 and 234. The offset created by the bends 242 and 244 allows the hooked ends 222 and 224 to pass over the sprinkler pipe 214 during installation without interference.

Figure 10:
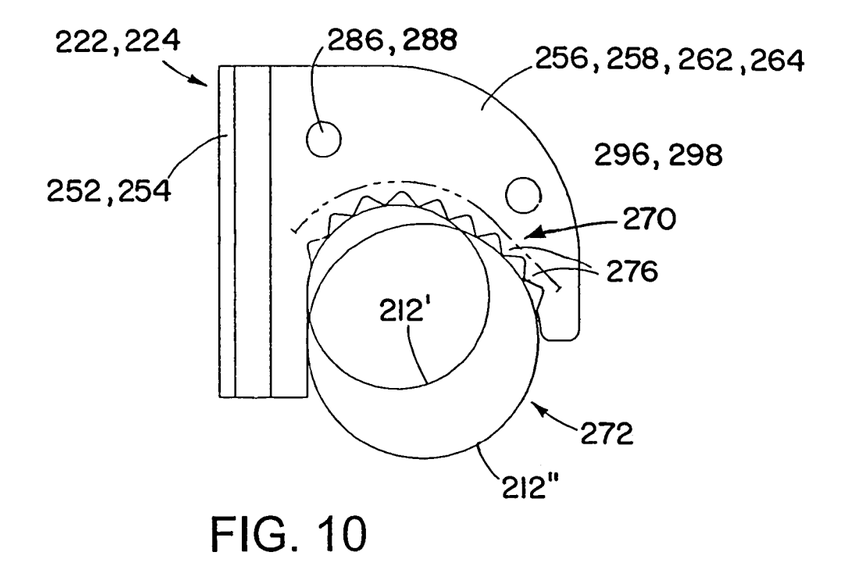
FIG. 10 is a detailed view of part of the sway brace fitting clamp of FIG. 8, showing the coupling of a hooked end of the clamp with a sway brace pipe.

The hooked ends 222 and 224 are stamped components each with a U-shaped profile, having respective rounded closed ends 252 and 254 fitting around the threaded portions 236 and 238 of the U-bolt legs 232 and 234. The hooked end 222 has a pair of hooked sides or legs 256 and 258, and the hooked end 224 has a pair of hooked sides or legs 262 and 264. With reference now in addition to FIG. 10, each of the legs 256, 258, 262, 264 of the U-shaped stamping has a V-shaped root 270 that defines an open slot 272 for receiving the sway brace pipe 212 within. The included angle of the V-shape root 270 defining the open slot 272 is 60°, although it should be recognized that any acute angle from 0 to 90° would function similarly. The V-shape root 270 has a radiused portion at its base. The open cutout with the V-shaped root 270 is designed to accommodate multiple sizes of sway brace pipe 212, for instance including 1 inch (25.4 mm) diameter pipe 212' and a 1.25 inch (31.8 mm) diameter pipe 212", to give only one example among many possibilities.

The edge profile of the open slot 272 and the V-shaped root 270 contains teeth 276 to engage the brace pipe 212. The teeth 276 each have an included angle of generally 90°, although it should be recognized that the angle could be greater or lesser. The teeth 276 are oriented generally so that their centerline is directed inward toward center of the brace pipe 212.

The application of the nuts 226 and 228 to the hooked ends 222 and 224, resisted by the sway brace pipe 212, imparts a moment to the hooked ends 222 and 224. To provide a second point of resistance against this moment, rivets 282 and 284 are added, through holes 286 and 288 in the hooked ends 222 and 224. The rivets 282 and 284 bear against the threaded portions 236 and 238 of the U-bolt 218. It should be recognized that the open ends of the U-shaped stamping (hooked ends) 222 and 224 can be free, or may be connected to one another by the use of stud(s) or rivet(s) 292 and 294 through pierced hole(s) 296 and 298.

Figure 11:
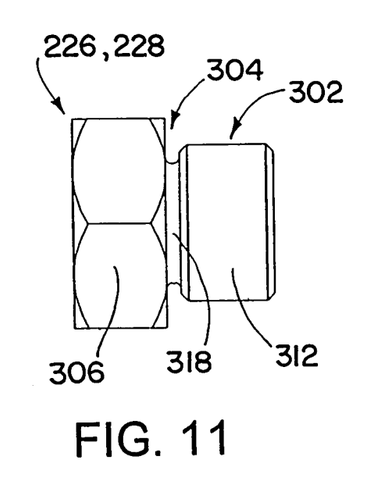
FIG. 11 is a side view of a shear nut of the clamp of FIG. 8.
Figure 12:
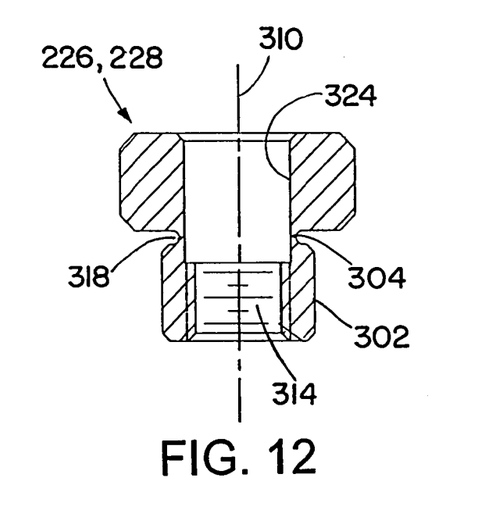
FIG. 12 is a sectional view of the shear nut of FIG. 11.

The clamping pressure to ensure the function of the brace fitting is generated through the use of a pair of nuts 226 and 228, one on each threaded portion 236 and 238 of the U-bolt 218. The nuts 226 and 228 may be tightened along the threaded portions 236 and 238 to press down against top edges of the hooked ends 222 and 224, through intervening washers 300 and 301. Referring now to FIGS. 11 and 12, the nuts 226 and 228 may be substantially identical, and may each include three sections 302, 304, and 306 along an axis 310 of the fastener 226, 228. The first portion or section 302 has a smooth outside surface 312, and internal threads 314. The central portion or section 304 is a shear band having a reduced diameter of the external surface of the fastener. The reduced diameter may be in the form of a groove 318. The inside diameter of this portion or section 304 is smooth. The combination of the external groove and smooth internal diameter produce a substantially thinner cross-section than the other two portions 302 and 306 of the fastener or shear nut. Alternatively the shear band may be excluded, leaving the nuts 226 and 228 as non-shear nuts. The third section 306 of the fastener is a portion allowing for application of torque to the threads. The external surface of the section 306 has a cross-section typically in the form of a hexagon. However, it should be recognized that other shapes would produce an equivalent result. The internal surface of the third portion 306 is a smooth diameter (cylindrical surface) 324 that can be of equal or greater diameter than the internal diameter of the second portion 304.

Upon the application of sufficient torque to the third portion 306 of the shear nut fasteners 226 and 228, the shear band 318 will fracture, preventing the application of any additional torque to the threaded portion of the fasteners 226 and 228. By their nature the threaded fasteners limit the torque applied to the thread, limiting the clamping force exerted by the nut onto the u-bolt.

Installed on the sprinkler pipe 214 and the brace pipe 212, the brace fitting 210 surrounds the two pipes 212 and 214. The hooks 222 and 224 engage the outermost surface of the brace pipe 212. The U-bolt 218 surrounds (fits around) the outermost surface of the sprinkler pipe 214. The installation of the brace fitting 210 compresses the brace pipe 212 and the sprinkler pipe 214 together, eliminating movement between the sprinkler pipe 212 and brace pipe 214 during a seismic event. The shear nuts 226 and 228 may be tightened to compress the pipes 212 and 214 together. The brace fitting clamp 210 advantageously may be installed with both of the pipes 212 and 214 already in place.

The components of the brace fitting clamps 10 and 210 may be made of any of a variety of suitable materials, for example steel or iron. One method of creating the hooked end components 222 and 224 is stamping. However, other manufacturing processes are casting, forging, or machining. A typical thickness is 0.125 inch (3.2 mm). Typically, the width (height) would be sufficiently larger than the sway brace pipe 212 in order to capture the sway brace pipe 212 and carry the required load around it. This may be about 2.5 inches (64 mm). However, it will be appreciated that a wide range of other dimensions are possible.

The sway brace assembly as installed resists any relative motion between the service pipe and structure during a seismic event. The loads associated with the restraint of the service pipe to the structure are carried from the sprinkler system pipe through the sway brace fitting, through the sway brace pipe, through the structural attachment, and into the structure itself. The interaction of the components of the sway brace fitting, described above, with the service pipe, and the sway brace pipe permits the brace fitting to transmit these seismic loads.

The sway brace fitting clamp 210 advantageously expedites and simplifies installation, reducing the number of part configurations, and creating functional parts for small diameter sprinkler system and other pipes and systems needing bracing.

Although the invention(s) has (have) been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of seismic bracing, the method comprising:
   placing a round sway brace substantially perpendicular to a service pipe;
   after the placing, engaging the round sway brace and the service pipe with a sway brace fitting clamp, wherein the engaging does not require movement of either the service pipe or the round sway brace; and
   tightening the sway brace fitting clamp to couple together the round sway brace and the service pipe;
   wherein the engaging includes:
      placing a U-shape bolt of the clamp around the service pipe; and
      placing a pair of hooks of the clamp around the round sway brace;
   wherein the hooks are coupled to legs of the U-shape bolt before and during the placing the bolt and the placing the hooks;
   wherein at least one of the engaging and the tightening includes having a central curved body of the U-shape bolt contact the service pipe;
   wherein the tightening includes moving the hooks toward the service pipe by tuning nuts of the clamp that are on threaded portions of the legs of the U-shape bolt;
   wherein the round sway brace is a sway brace pipe; and
   wherein the moving causes sharp tips of the legs to penetrate the sway brace pipe.

2. A method of seismic bracing, the method comprising:
   placing a round sway brace substantially perpendicular to a service pipe;
   after the placing, engaging the round sway brace and the service pipe with a sway brace fitting clamp, wherein the engaging does not require movement of either the service pipe or the round sway brace; and
   tightening the sway brace fitting clamp to couple together the round sway brace and the service pipe;
   wherein the tightening includes providing a force pulling the sway brace and the pipe together.

3. The method of claim 2,
   wherein the engaging includes:
      placing a U-shape bolt of the clamp around the service pipe; and
      placing a pair of hooks of the clamp around the round sway brace; and
   wherein the hooks are coupled to legs of the U-shape bolt before and during the placing the bolt and the placing the hooks; and
   wherein at least one of the engaging and the tightening includes having a central curved body of the U-shape bolt contact the service pipe.

4. The method of claim 3, wherein the tightening includes moving the hooks toward the service pipe by tuning nuts of the clamp that are on threaded portions of the legs of the U-shape bolt.

5. The method of claim 4, wherein the moving causes teeth of the hooks to press against the round sway brace.

6. The method of claim 4,
   wherein the nuts are shear nuts; and
   wherein the tightening continues until heads of the nuts have been sheared off.

7. A sway brace fitting clamp for coupling a round sway brace to an object, the clamp comprising:
   a U-shape bolt having a central curved body and a pair of threaded ends emanating from the central body;
   a pair of hooks coupled to respective of the ends; and
   nuts threaded onto the threaded ends, wherein the nuts can be rotated to bear against the hooks to move the hooks toward the curved body;
   whereby, in an installed position, the U-shape bolt and the hooks are positioned by adjusting the nuts, to secure the clamp, with each of the hooks providing a distributed contact along a circumferential line of the sway brace, with the contact over multiple points or an area.

8. The clamp of claim 7, wherein the nuts are shear nuts having heads configured to separated from threaded parts of the shear nuts at a predetermined torque.

9. The clamp of claim 7, wherein the nuts are rivet-nuts that are swaged to retain the nuts partially within the hooks.

10. The clamp of claim 7,
    wherein the hooks have a U shape, with each of the hooks having a central body and a pair of sides; and
    wherein the sides of each of the hooks defines an opening therein for receiving the round sway brace.

11. The clamp of claim 10, wherein the threaded ends of the U-shape bolts pass through holes in the central bodies of the hooks.

12. The clamp of claim 10, wherein the central bodies of the hooks wrap around the threaded ends.

13. The clamp of claim 10, wherein for each of the hooks the sides are diametrically opposed on opposite sides of one of the threaded ends.

14. The clamp of claim 10, wherein the sides of the hooks each have a V-shape root for receiving the round sway brace.

15. The clamp of claim 14, wherein the sides of the hooks have teeth facing inward toward the openings.

16. The clamp of claim 10, wherein the hooks are stamped sheet metal hooks.

17. The clamp of claim 7, wherein the threaded ends of the U-shape bolt are parts of legs of the bolt; and
    wherein the legs each have pairs of bends in them.

18. The clamp of claim 17, wherein the pairs of the bends separate the threaded ends farther apart than parts of the legs on the other side of the bends.

19. The sway brace fitting clamp of claim 7, wherein at least part of the nuts are outside of the hooks.

20. The sway brace fitting clamp of claim 19, wherein the at least part of the nuts is below the hooks, between the hooks and the central curved body of the U-shape bolt.

21. The sway brace fitting clamp of claim 8, in combination with the round sway brace.

22. The combination of claim 21, further in combination with the service pipe.

23. The combination of claim 21, wherein the round sway brace is a sway brace pipe.

24. A sway brace fitting clamp for coupling a round sway brace to an object, the clamp comprising:
- a U-shape bolt having a central curved body and a pair of threaded ends emanating from the central body;
- a pair of hooks coupled to respective of the ends; and
- nuts threaded onto the threaded ends, wherein the nuts can be rotated to bear against the hooks to move the hooks toward the curved body;
- wherein the threaded ends of the U-shape bolt are parts of legs of the bolt;
- wherein the round sway brace is a sway brace pipe; and
- wherein the legs have sharp tips for pressing against the sway brace pipe when the sway brace pipe is within pipe-receiving openings defined by the hooks;
- whereby, in an installed position, the U-shape bolt and the hooks are positioned by adjusting the nuts, to secure the clamp.

25. A sway brace fitting clamp for coupling a round sway brace to an object, the clamp comprising:
- a U-shape bolt having a central curved body and a pair of threaded ends emanating from the central body;
- a pair of hooks coupled to respective of the ends; and
- nuts threaded onto the threaded ends, wherein the nuts can be rotated to bear against the hooks to move the hooks toward the curved body;
- wherein at least part of the nuts are outside of the hooks; and
- wherein the at least part of the nuts is above the hooks, with the hooks between the at least part of the nuts and the central curved body of the U-shape bolt;
- whereby, in an installed position, the U-shape bolt and the hooks are positioned by adjusting the nuts, to secure the clamp.

* * * * *